US009509472B2

(12) United States Patent
Wu et al.

(10) Patent No.: US 9,509,472 B2
(45) Date of Patent: Nov. 29, 2016

(54) METHODS, DEVICES AND SYSTEM FOR TRANSMITTING SOUNDING REFERENCE SIGNAL AND USER EQUIPMENT

(71) Applicant: ZTE CORPORATION, Shenzhen, Guangdong Province (CN)

(72) Inventors: Shuanshuan Wu, Shenzhen (CN); Bo Dai, Shenzhen (CN); Ming Yuan, Shenzhen (CN); Feng Liang, Shenzhen (CN); Yifei Yuan, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 172 days.

(21) Appl. No.: 14/404,630

(22) PCT Filed: May 31, 2013

(86) PCT No.: PCT/CN2013/076613
§ 371 (c)(1),
(2) Date: Nov. 30, 2014

(87) PCT Pub. No.: WO2013/178095
PCT Pub. Date: Dec. 5, 2013

(65) Prior Publication Data
US 2015/0110037 A1    Apr. 23, 2015

(30) Foreign Application Priority Data

May 31, 2012   (CN) .......................... 2012 1 0176623

(51) Int. Cl.
*H04W 4/00*    (2009.01)
*H04L 5/00*    (2006.01)

(52) U.S. Cl.
CPC ........... *H04L 5/0048* (2013.01); *H04L 5/0094* (2013.01)

(58) Field of Classification Search
CPC ......... H04L 5/00; H04L 5/001; H04W 72/04
USPC ....... 370/329, 328, 330, 203, 280, 389, 281, 370/345, 344, 526; 455/452.1, 422.1, 517, 455/522
See application file for complete search history.

(56) References Cited

U.S. PATENT DOCUMENTS

| 8,938,247 B2* | 1/2015 | Gorokhov .............. H04B 7/024 370/256 |
| 2011/0275382 A1 | 11/2011 | Hakola et al. |
| 2014/0023008 A1* | 1/2014 | Ahn .................... H04W 76/023 370/329 |

FOREIGN PATENT DOCUMENTS

| CN | 101695191 A | 4/2010 |
| CN | 101827444 A | 9/2010 |

OTHER PUBLICATIONS

International Search Report (Form PCT/ISA/210) for PCT/CN2013/076613 mailed Sep. 5, 2013.

*Primary Examiner* — Chi H Pham
*Assistant Examiner* — Alexander O Boakye
(74) *Attorney, Agent, or Firm* — Koppel, Patrick, Heybl & Philpott

(57) ABSTRACT

Methods, devices and a system for transmitting an SRS and a UE are provided. A network node transmits an SRS configuration information set to a UE, wherein the SRS configuration information set includes first configuration information indicating the configuration of a first SRS and second configuration information indicating the configuration of a second SRS, wherein the first SRS is transmitted on a cellular uplink and used for performing uplink channel measurement during cellular communication; and the second SRS is transmitted on a D2D link and used for performing channel measurement of the D2D link during D2D communication. The solution addresses the problem of the configuration and the transmission of a reference signal existing in the conventional art when D2D communication is introduced into a cellular system, realizes the compatibility of D2D communication with cellular communication and avoids the noticeable increase in UE design and realization complexity.

20 Claims, 8 Drawing Sheets

METHODS, DEVICES AND SYSTEM FOR TRANSMITTING SOUNDING REFERENCE SIGNAL AND USER EQUIPMENT

TECHNICAL FIELD

The disclosure relates to the field of wireless communications and more particularly to methods, devices and a system for transmitting a sounding reference signal (SRS for short) and a user equipment (UE for short).

BACKGROUND

Cellular communication, which enables the reuse of limited spectrum resources, leads to the flourishing development of wireless communication technologies. In a cellular system, when a service needs to be transmitted between two UEs, service data to be transmitted from a User Equipment 1 (UE1) to a User Equipment 2 (UE2) is first transmitted to a base station 1 via an air interface, then the base station 1 transmits the user data to a base station 2 via a core network, and the base station 2 transmits the service data to the UE2 via an air interface. The data transmission from the UE2 to the UE1 is realized through a similar processing flow. FIG. 1 is a schematic diagram illustrating a cellular system in which UEs are located in the cell(s) of the same base station according to the conventional art. As shown in FIG. 1, when the UE1 and the UE2 are located in the cellular cell of the same base station, although base stations 1 and 2 are actually the same base station, two parts of wireless spectrum resources are consumed in a single data transmission process, and the transmitted data still needs to be forwarded by the core network.

It can be known from above that the foregoing cellular communication scheme is obviously not the optimal one when UE1 and UE2 are located in the same cell and are proximate. Actually, as mobile communication services become increasingly diversified, for example, as social networks and electronic payment are being used more and more widely in wireless communication systems, the demand for service transmission between users located at a near distance from each other increases continuously. Thus, device-to-device communication is drawing more and more attention. The so-called Device to Device (D2D for short) communication refers to the direct transmission of service data from a source UE to a destination UE via an air interface without being forwarded by a base station. FIG. 2 is a schematic diagram illustrating D2D communication according to the conventional art. As shown in FIG. 2, the D2D communication mode is different from the traditional cellular communication mode. For users communicating with each other at a near distance, D2D communication not only saves wireless spectrum resources but also reduces the data transmission workload of a core network.

In cellular communication, one of the references for scheduling is channel state. That is, a Reference Signal (RS for short, also referred to as pilot) is transmitted between a transmitter and a receiver, channel state information (CSI) indicating the state of a channel between a network node and a UE is obtained according to the measurement of the RS and used as a reference for scheduling.

The introduction of the D2D communication in a cellular system also affects the scheduling of service transmission. That is, when UEs are scheduled to perform D2D communication, the scheduling needs to be performed based on the channel state information indicating the state of a channel between the UEs, and this channel state information is obtained by measuring an RS. No solution has been provided in the conventional art to address the problem of the configuration and the transmission of a reference signal in a case where D2D communication is introduced into a cellular system.

SUMMARY

A scheme for transmitting an SRS is provided in the embodiments of the disclosure to at least address the problem of the configuration and the transmission of a reference signal in a case where D2D communication is introduced into a cellular system existing in the conventional art.

In accordance with an embodiment of the disclosure, a method for transmitting an SRS is provided which includes: transmitting, by a network node, an SRS configuration information set to a user equipment (UE), wherein the SRS configuration information set includes: first configuration information indicating configuration of a first SRS, and second configuration information indicating configuration of a second SRS, wherein the first SRS is transmitted on a cellular uplink and used for performing uplink channel measurement during cellular communication; and the second SRS is transmitted on a device-to-device (D2D) link and used for performing channel measurement of the D2D link during D2D communication.

In the described embodiment, the second SRS is an SRS transmitted from a UE to its peer UE during D2D communication, the SRS configuration information set further includes: third configuration information indicating configuration of a third SRS, wherein the third SRS is an SRS transmitted from the peer UE and detected by the UE during D2D communication and used for performing channel measurement of a D2D link during D2D communication.

In the described embodiment, each of the first configuration information, the second configuration information and the third configuration information includes: high layer configuration signaling, wherein the high layer configuration signaling includes at least one of the following parameters: bandwidth configuration of an SRS, subframe configuration, the number of transmission ports, transmission bandwidth, frequency hopping bandwidth, frequency location, duration, configuration index, transmission comb, sequence cyclic shift and power offset.

In the described embodiment, the second SRS is transmitted from the UE in a subframe meeting a first condition according to the configuration of the second configuration information and detects the third SRS in a subframe meeting a second condition according to the configuration of the third configuration information, wherein the subframe meeting the first condition and the subframe meeting the second condition include one of the following: the subframe meeting the first condition is a transmitting subframe of the UE during D2D communication and the subframe meeting the second condition is a receiving subframe of the UE during D2D communication; the subframe meeting the first condition is a cell-specific SRS subframe which is also a transmitting subframe of the UE during D2D communication and the subframe meeting the second condition is a cell-specific SRS subframe which is also a receiving subframe of the UE during D2D communication; and the subframe meeting the first condition is a cell-specific SRS subframe which is also an SRS subframe indicated by the second configuration information and also a transmitting subframe of the UE during D2D communication, and the subframe meeting the second condition is a cell-specific SRS subframe which is also an SRS subframe indicated by the third configuration information and also a receiving subframe of the UE during D2D communication.

In the described embodiment, the second SRS is transmitted from the UE in a subframe meeting the first condition according to the configuration of the second configuration information, wherein the subframe meeting the first condition includes one of: a transmitting subframe of the UE during D2D communication; a cell-specific SRS subframe which is also a transmitting subframe of the UE during D2D communication; a cell-specific SRS subframe which is also an SRS subframe indicated by the second configuration information and also a transmitting subframe of the UE during D2D communication; an SRS subframe indicated by the second configuration information which is also a transmitting subframe of the UE during D2D communication; an SRS subframe indicated by the second configuration information; and a cell-specific SRS subframe which is also an SRS subframe indicated by the second configuration information.

In the described embodiment, the third SRS is detected by the UE in a subframe meeting a second condition according to the configuration of the third configuration information, wherein the subframe meeting the second condition includes one of: a receiving subframe of the UE during D2D communication; a cell-specific SRS subframe which is also a receiving subframe of the UE during D2D communication; a cell-specific SRS subframe which is also an SRS subframe indicated by the third configuration information and also a receiving subframe of the UE during D2D communication; an SRS subframe indicated by the third configuration information which is also a receiving subframe of the UE during D2D communication; an SRS subframe indicated by the third configuration information; and a cell-specific SRS subframe which is also an SRS subframe indicated by the third configuration information.

In the described embodiment, a first triggering signaling for triggering the UE to transmit the second SRS is contained in the second configuration information, a second triggering signaling for triggering the UE to detect the third SRS is contained in the third configuration information, and after the network node transmits the SRS configuration information set to the UE, the method further includes: after the UE receives the first triggering signaling, transmitting, by the UE, the second SRS in the first subframe meeting a first pre-defined interval requirement and the first condition; and after the UE receives the second triggering signaling, detecting, by the UE, the third SRS in the first subframe meeting a second pre-defined interval requirement and the second condition, wherein the first pre-defined interval is a minimal time interval between the subframe receiving the first triggering signaling and the subframe transmitting the second SRS, and the second pre-defined interval is a minimal time interval between the subframe receiving the second triggering signaling and the subframe receiving the third SRS.

In the described embodiment, the first SRS transmitted by a UE to a peer UE in D2D communication is also used by the peer UE to perform channel measurement of the D2D link, and the second SRS transmitted by the peer UE in D2D communication is used for the UE to perform channel measurement of a D2D link during the D2D communication.

In the described embodiment, a subframe used by the UE to transmit the first SRS is a subframe meeting a first condition according to the configuration of the first configuration information, and a subframe used by the UE to detect the second SRS is a subframe meeting a second condition according to the configuration of the second configuration information, wherein the subframe meeting the first condition is an SRS subframe indicated by the first configuration information, the subframe meeting the second condition is an SRS subframe indicated by the second configuration information, and the subframe meeting the first condition and the subframe meeting the second condition are also cell-specific subframes.

In the described embodiment, the first configuration information contains first triggering signaling for triggering the UE to transmit the first SRS, the second configuration information contains second triggering signaling for triggering the UE to detect the second SRS, and after the network node transmits the SRS configuration information set to the UE, the method further includes: when the UE receives the first triggering signaling, transmitting, by the UE, the first SRS in the first subframe meeting a first pre-defined interval requirement and the first condition; and when the UE receives the second triggering signaling, detecting, by the UE, the second SRS in the first subframe meeting a second pre-defined interval requirement and the second condition, wherein the first pre-defined interval is a minimal time interval between the subframe receiving the first triggering signaling and the subframe transmitting the first SRS, and the second pre-defined interval is a minimal time interval between the subframe receiving the second triggering signaling and the subframe receiving the second SRS.

In the described embodiment, the first configuration information contains a power offset parameter, wherein the power offset parameter includes a first power offset and a second power offset, wherein the first power offset is used for determining the power at which the UE transmits the first SRS on uplink in a cellular system and the second power offset is used for determining the power at which the UE transmits the first SRS on a D2D link; and after the network node transmits the SRS configuration information set to the UE, the method further includes: if the subframe transmitting the first SRS is a D2D communication transmitting subframe of the UE, transmitting, by the UE, the first SRS at the second power offset, otherwise, transmitting, by the UE, the first SRS at the first power offset.

In the described embodiment, the second SRS is an SRS transmitted by the UE to its peer UE during D2D communication and used for the peer UE to perform channel measurement during D2D communication, and an SRS transmitted by the peer UE and detected by the UE during D2D communication and used for the UE to perform channel measurement of D2D communication.

In the described embodiment, the first configuration information and/or the second configuration information include/ includes: high layer configuration signaling, wherein the high layer configuration signaling includes at least one of the following parameters: bandwidth configuration of an SRS, subframe configuration, the number of transmission ports, transmission bandwidth, frequency hopping bandwidth, frequency location, duration, configuration index, transmission comb, sequence cyclic shift and power offset.

In the described embodiment, a subframe used by the UE to transmit the second SRS is a subframe meeting a first condition according to the configuration of the second configuration information, and a subframe used by the UE to detect the second SRS is a subframe meeting a second condition according to the configuration of the second configuration information, wherein the subframe meeting the first condition and the subframe meeting the second condition include one of the following: the subframe meeting the first condition is a transmitting subframe of the UE during D2D communication and the subframe meeting the second condition is a receiving subframe of the UE during D2D communication; the subframe meeting the first condition is a cell-specific SRS subframe which is also a transmitting subframe of the UE during D2D communication and the subframe meeting the second condition is a cell-specific SRS subframe which is also a receiving subframe of the UE during D2D communication; and the subframe meeting the first condition is a cell-specific SRS subframe which is also an SRS subframe indicated by the second configuration information and also a transmitting subframe of the UE during D2D communication, and the subframe meeting the second condition is a cell-specific SRS subframe which is also an SRS subframe indicated by the third configuration information and also a receiving subframe of the UE during D2D communication.

In the described embodiment, the second SRS is transmitted by the UE in a subframe meeting a first condition according to the configuration of the second configuration information, wherein the subframe meeting the first condition includes one of: a transmitting subframe of the UE during D2D communication; a cell-specific SRS subframe which is also a transmitting subframe of the UE during D2D communication; and a cell-specific SRS subframe which is also an SRS subframe indicated by the second configuration information and also a transmitting subframe of the UE during D2D communication.

In the described embodiment, the second SRS is detected by the UE in a subframe meeting a second condition according to the configuration of the second configuration information, wherein the subframe meeting the second condition includes one of: a receiving subframe of the UE during D2D communication; a cell-specific SRS subframe which is also a receiving subframe of the UE during D2D communication; and a cell-specific SRS subframe which is also an SRS subframe indicated by the second configuration information and also a receiving subframe of the UE during D2D communication.

In the described embodiment, the second configuration information contains first triggering signaling for triggering the UE to transmit the second SRS and second triggering signaling for triggering the UE to detect the second SRS, and after the network node transmits the SRS configuration information set to the UE, the method further includes: after the UE receives the first triggering signaling, transmitting, by the UE, the second SRS in the first subframe meeting a first pre-defined interval requirement and the first condition; and after the UE receives the second triggering signaling, detecting, by the UE, the second SRS in the first subframe meeting a second pre-defined interval requirement and the second condition, wherein the first pre-defined interval is a minimal time interval between the subframe receiving the first triggering signaling and the subframe transmitting the second SRS, and the second pre-defined interval is a minimal time interval between the subframe receiving the second triggering signaling and the subframe receiving the second SRS.

In the described embodiment, after the network node transmits the SRS configuration information set to the UE, the method further includes: transmitting, by the UE, the first SRS, which is used for performing uplink channel measurement in a cellular system, to the network node according to the first configuration information, or transmitting, by the UE, the first SRS, which is used for performing channel measurement of a D2D link, to the peer UE according to the first configuration information during D2D communication; and/or the UE transmitting the second SRS to the peer UE or detecting the second SRS from the peer UE during D2D communication according to the second configuration information to perform channel measurement of a D2D link.

In accordance with another embodiment of the disclosure, a method for transmitting a Sounding Reference Signal (SRS) is provided which includes: receiving, by a user equipment (UE), an SRS configuration information set from a network node, wherein the SRS configuration information set includes first configuration information indicating configuration of a first SRS and second configuration information indicating configuration of a second SRS, wherein the first SRS is transmitted on a cellular uplink and used for performing uplink channel measurement during cellular communication; and the second SRS is transmitted on a device-to-device (D2D) link and used for performing channel measurement of the D2D link during D2D communication.

In the described embodiment, the second SRS is an SRS transmitted from a UE to its peer UE during D2D communication, the SRS configuration information set further includes: third configuration information indicating configuration of a third SRS, wherein the third SRS is an SRS transmitted from the peer UE and detected by the UE during D2D communication and used for performing channel measurement of a D2D link during D2D communication.

In the described embodiment, the first SRS transmitted by the UE to its peer UE in D2D communication is also used for the peer UE to perform channel measurement of a D2D link; and the second SRS transmitted by the peer UE in D2D communication is used for the UE to perform channel measurement of a D2D link during the D2D communication.

In the described embodiment, the second SRS is an SRS transmitted by the UE to its peer UE during D2D communication for the peer UE to perform channel measurement of D2D communication and an SRS transmitted by the peer UE and detected by the UE during D2D communication and used for the UE to perform channel measurement of D2D communication.

In the described embodiment, after the UE receives, from the network node, the SRS configuration information set indicating the SRS configuration, the method further includes: transmitting, by the UE, the first SRS, which is used for performing uplink channel measurement in a cellular system, to the network node according to the first configuration information or transmitting, by the UE, the first SRS, which is used for performing channel measurement of a D2D link, to the peer UE according to the first configuration information during D2D communication; and/or the UE transmitting the second SRS to the peer UE or detecting the second SRS from the peer UE during D2D communication according to the second configuration information to perform channel measurement of a D2D link.

In accordance with still another embodiment of the disclosure, a device for transmitting a Sounding Reference Signal (SRS) located at a network node is provided which includes: a transmitting component configured to transmit an SRS configuration information set to a user equipment (UE), wherein the SRS configuration information set includes first configuration information indicating configuration of a first SRS and second configuration information indicating configuration of a second SRS, wherein the first SRS is transmitted on a cellular uplink and used for performing uplink channel measurement during cellular communication; and the second SRS is transmitted on a device-to-device (D2D) link and used for performing channel measurement of the D2D link during D2D communication.

In accordance with still another embodiment of the disclosure, a user equipment (UE) is provided which includes: a receiving component configured to receive, from a network node, an SRS configuration information set indicating Sounding Reference Signal (SRS) configuration, wherein the SRS configuration information set includes first configuration information indicating configuration of a first SRS and second configuration information indicating configuration of a second SRS, wherein the first SRS is transmitted on a cellular uplink and used for performing uplink channel measurement during cellular communication; and the second SRS is transmitted on a device-to-device (D2D) link and used for performing channel measurement of the D2D link during D2D communication.

In the described embodiment, the UE further includes: a first configuration information component configured to transmit the first SRS, which is used for performing uplink channel measurement in a cellular system, to the network node according to the first configuration information or transmit the first SRS, which is used for performing channel measurement of a D2D link, to a peer UE during D2D communication according to the first configuration information; and/or a second configuration information component configured to transmit the second SRS to the peer UE or detect the second SRS from the peer UE during D2D communication according to the second configuration information to perform channel measurement of a D2D link.

In accordance with still another embodiment of the disclosure, a system for transmitting a Sounding Reference Signal (SRS) is provided which includes the above device for transmitting the SRS and the above UE.

By transmitting an SRS configuration information set from a network node to a UE, the foregoing methods and devices address the problem of the configuration and the transmission of a reference signal existing in the conventional art when D2D communication is introduced into a cellular system and consequentially address the problem of the measurement on a channel during D2D communication to provide a reference for the scheduling of D2D communication. Moreover, the methods and devices also realize the compatibility of D2D communication with cellular communication and avoid the noticeable increase in UE design and realization complexity.

BRIEF DESCRIPTION OF THE DRAWINGS

The accompanying drawings described here are provided for a better understanding of the disclosure and constitute one part of the disclosure, and the exemplary embodiments of the disclosure and description thereof are illustrative of the disclosure but are not to be construed as limiting the disclosure. In the accompanying drawings.

DETAILED DESCRIPTION OF THE EMBODIMENTS

Figure 1:
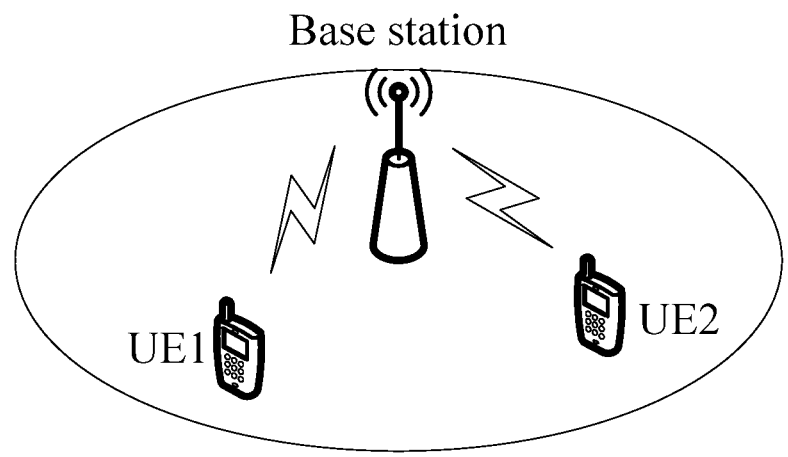
FIG. 1 is a schematic diagram illustrating a cellular system in which UEs are located in the cell(s) of the same base station according to the conventional art.
Figure 2:
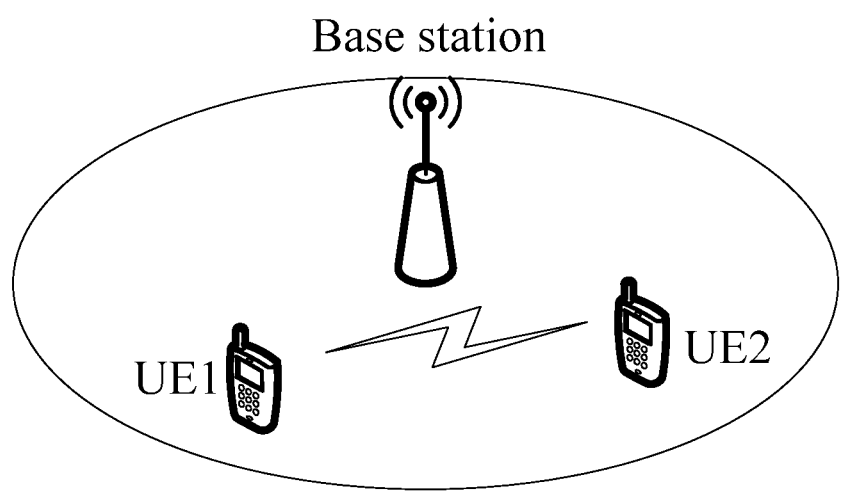
FIG. 2 is a schematic diagram illustrating D2D communication according to the conventional art.

The disclosure is described below in detail with reference to accompanying drawings when read in conjunction with embodiments. It should be noted that embodiments of the disclosure and the features thereof can be combined with each other if no conflict is caused.

According to an embodiment of the disclosure, a method for transmitting an SRS is provided which includes the following step that: a network node transmits an SRS configuration information set to a user equipment (UE, or known as terminal), wherein the SRS configuration information set includes first configuration information indicating the configuration of a first SRS and second configuration information indicating the configuration of a second SRS, wherein the first SRS is transmitted on a cellular uplink and used for performing uplink channel measurement during cellular communication; and the second SRS is transmitted on a device-to-device (D2D) link and used for performing channel measurement of the D2D link during D2D communication.

According to an embodiment of the disclosure, another method for transmitting an SRS is provided which includes the following step that: a UE receives, from a network node, an SRS configuration information set indicating the SRS configuration, wherein the SRS configuration information set includes first configuration information indicating the configuration of a first SRS and second configuration information indicating the configuration of a second SRS, wherein the first SRS is transmitted on a cellular uplink and used for performing uplink channel measurement during cellular communication; and the second SRS is transmitted on a device-to-device (D2D) link and used for performing channel measurement of the D2D link during D2D communication.

Through the foregoing steps in which a network node transmits an SRS configuration information set to a UE, the methods provided herein address the problem of the configuration and the transmission of a reference signal existing in the conventional art when D2D communication is introduced into a cellular system and consequentially address the problem of the measurement on a channel during D2D communication, thereby providing a reference for the scheduling of D2D communication. Moreover, the methods also realize the compatibility of D2D communication with cellular communication and avoid the noticeable increase in UE design and realization complexity.

It should be noted that the measurement on a channel during D2D communication refers to the measurement on the channel state information of a D2D link or the synchronization of a D2D link, wherein the channel state information includes, but not limited to, channel quality information, a pre-coding matrix indicator, a rank indicator and a Signal to Interference plus Noise Ratio (SINR).

The following three schemes may be adopted in the implementation process.

Scheme (1): the second SRS is an SRS transmitted from a UE to its peer UE during D2D communication and used for the peer UE to perform channel measurement of a D2D link during D2D communication. The SRS configuration information set may further include: third configuration information indicating the configuration of a third SRS which is an SRS transmitted by the peer UE and detected by the UE during D2D communication and used for the UE to perform channel measurement of a D2D link during D2D communication;

Scheme (2): the first SRS transmitted from a UE to its peer UE in D2D communication is also used for the peer UE to perform channel measurement of a D2D link; and the second SRS transmitted by the peer UE in D2D communication is used for the UE to perform channel measurement of a D2D link during the D2D communication; and Scheme (3): the second SRS is an SRS transmitted from a UE to its peer UE during D2D communication and used for the peer UE to perform channel measurement of a D2D link during D2D communication and an SRS transmitted by the peer UE and detected by the UE during D2D communication and used for the UE to perform channel measurement of a D2D link during D2D communication.

In the described embodiment, after receiving the SRS configuration information set from the network node, the UE transmits the first SRS, which is used for performing uplink channel measurement in a cellular system, to the network node according to the first configuration information or transmit the first SRS, which is used for performing channel measurement of a D2D link, to a peer UE during D2D communication according to the first configuration information; and/or the UE transmits the second SRS to the peer UE according to the second configuration information or detects the second SRS from the peer UE during D2D communication to measure the channel of a D2D link.

Figures 3, 4, 5:
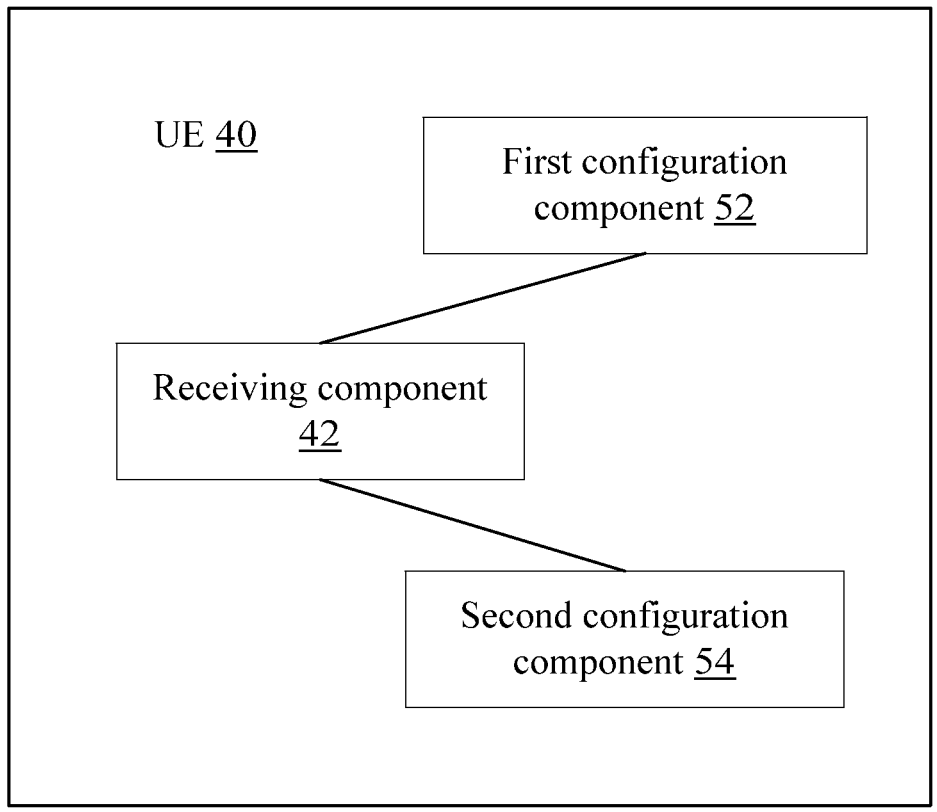
FIG. 3 is a block diagram illustrating the structure of a device for transmitting an SRS according to an embodiment of the disclosure.
FIG. 4 is a block diagram illustrating the structure of a UE according to an embodiment of the disclosure.
FIG. 5 is a block diagram illustrating the structure of a UE according to an example embodiment of the disclosure.

Corresponding to a transmission method used at a network side, a device for transmitting an SRS is also provided in an embodiment of the disclosure. FIG. 3 is a block diagram illustrating the structure of a device for transmitting an SRS according to an embodiment of the disclosure. As shown in FIG. 3, the transmission device 30 located at a network node includes: a transmitting component 32 configured to transmit an SRS configuration information set to a UE, wherein the SRS configuration information set includes first configuration information indicating the configuration of a first SRS and second configuration information indicating the configuration of a second SRS, wherein the first SRS is transmitted on a cellular uplink and used for performing uplink channel measurement during cellular communication; and the second SRS is transmitted on a device-to-device (D2D) link and used for performing channel measurement of the D2D link during D2D communication.

In the described embodiment, the transmission device 30 further includes: a configuration component 34 coupled with the transmitting component 32 and configured to configure SRS parameters of the UE and generate the SRS configuration information set. After the configuration component 34 generates the SRS configuration information set, the transmitting component 3 transmits the generated SRS configuration information set to the UE.

Corresponding to a transmission method used at a UE side, a UE is provided in an embodiment of the disclosure. FIG. 4 is a block diagram illustrating the structure of a UE according to an embodiment of the disclosure. As shown in FIG. 4, the UE 40 includes: a receiving component 42 configured to receive, from a network node, an SRS configuration information set indicating the SRS configuration, wherein the SRS configuration information set includes first configuration information indicating the configuration of a first SRS and second configuration information indicating the configuration of a second SRS, wherein the first SRS is transmitted on a cellular uplink and used for performing uplink channel measurement during cellular communication; and the second SRS is transmitted on a device-to-device (D2D) link and used for performing channel measurement of the D2D link during D2D communication.

FIG. 5 is a block diagram illustrating the structure of a UE according to an example embodiment of the disclosure. As shown in FIG. 5, the UE 40 further includes: a first configuration information component 52 configured to transmit the first SRS, which is used for performing uplink channel measurement in a cellular system, to the network node according to the first configuration information or transmit the first SRS, which is used for performing channel measurement of a D2D link, to a peer UE during D2D communication according to the first configuration information; and/or a second configuration information component 54 configured to transmit the second SRS to the peer UE or detect the second SRS from the peer UE during D2D communication according to the second configuration information to perform channel measurement of a D2D link.

Figure 6:
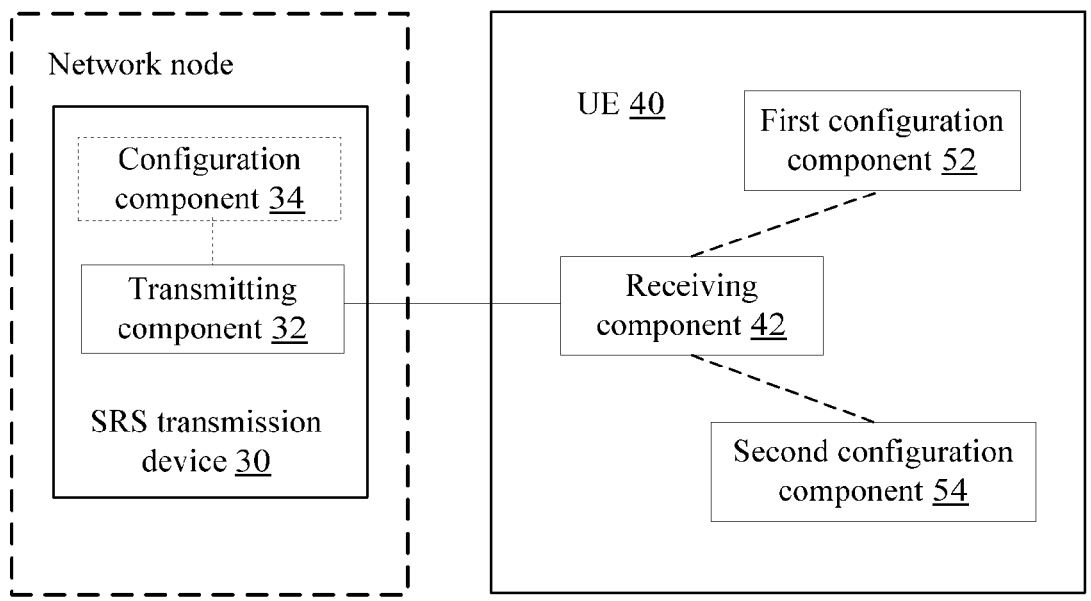
FIG. 6 is a block diagram illustrating the structure of a system for transmitting an SRS according to an embodiment of the disclosure.

According to an embodiment of the disclosure, a system for transmitting an SRS is provided. FIG. 6 is a block diagram illustrating the structure of the system for transmitting an SRS according to the embodiment. As shown in FIG. 6, the system includes: the foregoing device 30 for transmitting an SRS during D2D communication and the foregoing UE 40 for D2D communication.

By transmitting an SRS configuration information set from a network node to a UE, the foregoing system addresses the problem of the configuration and the transmission of a reference signal existing in the conventional art when D2D communication is introduced into a cellular system and realizes the compatibility of D2D communication with cellular communication and is therefore improved in performance.

To make the foregoing embodiments understood better, other example embodiments of the disclosure are described in detail below.

A method for transmitting a reference signal is provided in an embodiment to address the problem of the configuration and the transmission of a reference signal in a cellular system supportive to D2D communication.

First, a configuration method for a reference signal is provided which includes:

transmitting an SRS configuration information set to a UE, wherein the configuration information set at least includes first configuration information and second configuration information, the first configuration information indicating the configuration of a first SRS and the second configuration information indicating the configuration of a second SRS, wherein the first SRS is the SRS of a cellular uplink which is used for a UE to measure the channel of the uplink during cellular communication, and the second SRS is a D2D communication SRS which is used for the UE to perform channel measurement of a D2D link during D2D communication.

Corresponding to scheme (1), the configuration method may further include that: the configuration information set further includes third configuration information indicating the configuration of a third SRS, wherein the first SRS is transmitted by the UE for a network node to measure the channel of a cellular uplink; the second SRS is transmitted by the UE for a peer UE implementing D2D communication with the UE to measure the channel of a D2D link; and the third SRS is transmitted by the peer UE performing D2D communication with the UE and is used for the UE to perform channel measurement of a D2D link during D2D communication.

Corresponding to scheme (2), the configuration method may further include that: the first SRS is transmitted by the UE for a network node to measure the channel of a cellular uplink and/or for a peer UE performing D2D communication with the UE to measure the channel of a D2D link during D2D communication; and the second SRS is transmitted by the peer UE performing D2D communication with the UE and is used for the UE to perform channel measurement of a D2D link during D2D communication.

Corresponding to scheme (3), the configuration method may further include that: the first SRS is transmitted by the UE for a network node to measure the channel of a cellular uplink; and the second SRS is transmitted by the UE for a peer UE performing D2D communication with the UE to measure the channel of a D2D link; and/or the second SRS is transmitted by the peer UE performing D2D communication with the UE for the UE to measure the channel of a D2D link.

In the described embodiment, the first and/or the second and/or the third configuration information may include high layer configuration signaling which includes at least one of the following parameters: the bandwidth configuration of an SRS, subframe configuration, the number of transmission ports, transmission bandwidth, frequency hopping bandwidth, frequency location, duration, configuration index, transmission comb, sequence cyclic shift and power offset.

In scheme (1), the method may further include: the UE transmits the second SRS in a subframe meeting a first condition according to the configuration of the second configuration information and detects the third SRS in a subframe meeting a second condition according to the configuration of the third configuration information, wherein the subframe meeting the first condition and the subframe meeting the second condition include one of the following:

Situation 1: the subframe meeting the first condition is the D2D communication transmitting subframe of the UE, and the subframe meeting the second condition is the receiving subframe of the UE during D2D communication;

Situation 2: the subframe meeting the first condition is a cell-specific SRS subframe which is also the D2D communication transmitting subframe of the UE, and the subframe meeting the second condition is a cell-specific SRS subframe which is also the D2D communication receiving subframe of the UE;

Situation 3: the subframe meeting the first condition is a cell-specific SRS subframe which is also an SRS subframe indicated by the second configuration information and the D2D communication transmitting subframe of the UE, and the subframe meeting the second condition is a cell-specific SRS subframe which is also an SRS subframe indicated by the third configuration information and the D2D communication receiving subframe of the UE.

Situation 4: the subframe meeting the first condition is an SRS subframe indicated by the second configuration information which is also the D2D communication transmitting subframe of the UE, and the subframe meeting the second condition is an SRS subframe indicated by the third configuration information which is also the D2D communication receiving subframe of the UE;

Situation 5: the subframe meeting the first condition is an SRS subframe indicated by the second configuration information, and the subframe meeting the second condition is an SRS subframe indicated by the third configuration information; and Situation 6: the subframe meeting the first condition is a cell-specific SRS subframe which is also an SRS subframe indicated by the second configuration information, and the subframe meeting the second condition is a cell-specific SRS subframe which is also an SRS subframe indicated by the third configuration information.

In Scheme (1), in the described embodiment, the second configuration information may further include triggering signaling, when the triggering signaling triggers the UE to transmit the second SRS, the UE transmits the second SRS in the first subframe meeting a pre-defined interval requirement and the first condition; and the third configuration information further includes triggering signaling, when the triggering signaling triggers the UE to detect the third SRS, the third SRS is detected by the UE in the first subframe meeting a pre-defined interval requirement and the second condition, wherein the pre-defined interval is the minimal time interval between a triggering signaling receiving subframe and an SRS receiving or transmitting subframe.

In Scheme (2), it may be further included that the UE transmits the first SRS in a subframe meeting a first condition according to the configuration of the first configuration information and detects the second SRS in a subframe meeting a second condition according to the configuration of the second configuration information, wherein the situation that a subframe meeting a first condition and a subframe meeting a second condition refers to that the subframe meeting the first condition is a cell-specific SRS subframe which is also an SRS subframe indicated by the first configuration information and the subframe meeting the second condition is a cell-specific SRS subframe which is also an SRS subframe indicated by the second configuration information.

In Scheme (2), in the described embodiment, the first configuration information may further include triggering signaling, when the triggering signaling triggers the UE to transmit the first SRS, the UE transmits the first SRS in the first subframe meeting a pre-defined interval requirement and the first condition; and the second configuration information further includes triggering signaling, when the triggering signaling triggers the UE to detect the second SRS, the UE detects the second SRS in the first subframe meeting a pre-defined interval requirement and the second condition, wherein the pre-defined interval is the minimal time interval between a triggering signaling receiving subframe and an SRS receiving or transmitting subframe.

Besides, in Scheme (2), the power offset contained in the first configuration information may include a first power offset and a second power offset, wherein the first power offset is used for determining the power at which the UE transmits the first SRS on a cellular uplink and the second power offset is used for determining the power at which the UE transmits the first SRS on a D2D link; if the subframe transmitting the first SRS is a D2D communication transmitting subframe of the UE, then the UE transmits the first SRS at the second power offset, otherwise, the UE transmits the first SRS at the first power offset.

In Scheme (3), it may be further included that the UE transmits the second SRS in a subframe meeting a first condition according to the configuration of the second configuration information and detects the second SRS in a subframe meeting a second condition according to the configuration of the second configuration information, wherein the situation that a subframe meets a first condition and a subframe meets a second condition refers to at least one of the following situations:

Situation 1: the subframe meeting the first condition is the D2D communication transmitting subframe of the UE, and the subframe meeting the second condition is the D2D communication receiving subframe of the UE;

Situation 2: the subframe meeting the first condition is a cell-specific SRS subframe which is also the D2D communication transmitting subframe of the UE, and the subframe meeting the second condition is a cell-specific SRS subframe which is also the receiving subframe of the UE during D2D communication;

Situation 3: the subframe meeting the first condition is a cell-specific SRS subframe which is also an SRS subframe indicated by the second configuration information and the D2D communication transmitting subframe of the UE, and the subframe meeting the second condition is a cell-specific SRS subframe which is also an SRS subframe indicated by the second configuration information and the D2D communication receiving subframe of the UE.

In Scheme (3), it may be further included that the UE detects the second SRS in a subframe meeting a first condition according to the configuration of the second configuration information, wherein the subframe meeting the first condition includes at least one of: a transmitting subframe of the UE during D2D communication; a cell-specific SRS subframe which is also a transmitting subframe of the UE during D2D communication; a cell-specific SRS subframe which is also an SRS subframe indicated by the second configuration information and also the transmitting subframe of the UE during D2D communication.

In Scheme (3), it may be further included that the UE detects the second SRS in a subframe meeting a second condition according to the configuration of the second configuration information, wherein the subframe meeting the second condition includes at least one of: a receiving subframe of the UE during D2D communication; a cell-specific SRS subframe which is also a receiving subframe of the UE during D2D communication; a cell-specific SRS subframe which is also an SRS subframe indicated by the second configuration information and also the receiving subframe of the UE during D2D communication.

In Scheme (3), in the described embodiment, the second configuration information may further include triggering signaling, when the triggering signaling triggers the UE to transmit the second SRS, the UE transmits the second SRS in the first subframe meeting a pre-defined interval requirement and the first condition; and the second configuration information further includes triggering signaling, when the triggering signaling triggers the UE to detect the second SRS, the UE detects the second SRS in the first subframe meeting a pre-defined interval requirement and the second condition, wherein the pre-defined interval is the minimal time interval between a triggering signaling receiving subframe and an SRS receiving or transmitting subframe.

Secondarily, another method for transmitting a reference signal is provided which includes:

receiving a SRS configuration information set, wherein the configuration information set at least includes first configuration information and second configuration information, the first configuration information indicating the configuration of a first SRS and the second configuration information indicating the configuration of a second SRS, wherein the first SRS is an SRS of a cellular uplink which is used by the UE to measure the channel of a cellular uplink, and the second SRS is a D2D communication SRS which is used by the UE to measure the channel of a D2D link during D2D communication.

in Scheme (1), the configuration information set further includes third configuration information indicating the configuration of a third SRS; the UE transmits the first SRS which is used for a network node to measure the channel of a cellular uplink; the UE receives the second SRS which is transmitted by a peer UE performing D2D communication with the UE for the UE to measure the channel of a D2D link; and the UE transmits the third SRS which is used for the peer UE performing D2D communication with the UE to measure the channel of a D2D link.

In Scheme (2), the UE may transmit the first SRS which is used for the network node to measure the channel of a cellular uplink and/or for the peer UE performing D2D communication with the UE to measure the channel of a D2D link; and the UE receives the second SRS which is transmitted by the peer UE performing D2D communication with the UE for the UE to measure the channel of the D2D link.

in Scheme (3), the UE may transmit the first SRS which is used for the network node to measure the channel of a cellular uplink; the UE transmits the second SRS which is used for the peer UE performing D2D communication with the UE to measure the channel of a D2D link; and or the UE receives the second SRS which is transmitted by the peer UE performing D2D communication with the UE for the UE to measure the channel of a D2D link.

The implementation process of the foregoing embodiments is described below in detail with reference to accompanying drawings when read in conjunction with example embodiments.

Embodiment 1

For the time variation property and the unpredictability of wireless channel, channel state is a time-varying state. Thus, the spectrum frequency of a wireless communication system can be greatly improved by adjusting the code rate and the modulation scheme (also referred to as Modulation and Coding Scheme (MCS) in some systems) in real time using an Adaptive Modulation and Coding (AMC) technology.

When AMC is used in a system, if there is Channel State Information (CSI) serving as a reference for transmission MCS adjustment, then a more accurate scheduling can be achieved to better exploit the advantages of AMC in performance. Generally, CSI cannot be obtained without measuring a Reference Signal (RS, also called Pilot), and the similar problem is confronted when D2D communication is introduced into a cellular system.

To address the problem above, a D2D communication method is provided in an embodiment which includes: transmitting the SRS configuration information set to an UE, wherein the configuration information set at least includes first configuration information and second configuration information, the first configuration information indicating the configuration of a first SRS and the second configuration information indicating the configuration of a second SRS, wherein the first SRS is an SRS of a cellular uplink which is used for the UE to measure the channel of a cellular uplink, the second SRS is a D2D communication SRS which is used for the UE to measure the channel of a D2D link during D2D communication; and the first SRS and the second SRS are both transmitted in subframes of uplink.

In the embodiment, there are at least two groups of SRS configuration information indicated to the UE, including: a group of configuration information which is first configuration information indicating the configuration of the SRS of uplink during cellular communication, wherein the SRS is used for the UE to measure uplink during cellular communication; and another group of configuration information which is second configuration information indicating the SRS configuration during D2D communication, wherein the SRS is used for the UE to measure a D2D link during D2D communication.

The following three transmission schemes are adoptable in the implementation process:

Scheme (1), the configuration information set further includes third configuration information indicating the configuration of a third SRS, moreover, the first SRS is transmitted by the UE for a network node to measure the channel of uplink during cellular communication; the second SRS is transmitted by the UE for a peer UE performing D2D communication with the UE to measure the channel of a D2D link; and the third SRS is transmitted by the peer UE performing D2D communication with the UE for the UE to measure the channel of a D2D link;

Scheme (2), the first SRS is transmitted by the UE for a network node to measure the channel of a cellular uplink and/or for a peer UE performing D2D communication with the UE to measure the channel of a D2D link; and the second SRS is transmitted by the peer UE performing D2D communication with the UE and is used for the UE to perform channel measurement of a D2D link during D2D communication. That is, the D2D communication SRS transmitted by the UE has the same configuration with the cellular uplink SRS transmitted by the UE; and Scheme (3): the first SRS is transmitted by the UE for a network node to measure the channel of a cellular uplink; the second SRS is transmitted by the UE for a peer UE performing D2D communication with the UE to measure the channel of a D2D link; and/or the second SRS is transmitted by the peer UE performing D2D communication with the UE for the UE to measure the channel of a D2D link. That is, UEs between which D2D communication is carried out have the same D2D communication SRS configuration, and the transmission of SRSs from the UEs can be multiplexed in a time division multiplexing way, for example, both of the UE and the peer UE only transmit a D2D communication SRS in their own D2D transmitting subframes.

Embodiment 2

The following description is given based on a background of a 3rd Generation Partnership Project (3GPP) Long Term Evolution (LTE)/LTD-Advanced (LTE-A) cellular system. In an LTE/LTE-A system, downlink is based on an Orthogonal Frequency Division Multiplexing Access (OFDMA) technology while uplink adopts a Single Carrier-Frequency Division Multiplexing Access (SC-FDMA) scheme. In an OFDMA/SC-FDMA system, communication resources are used in a time frequency two-dimensional mode.

Figure 7:
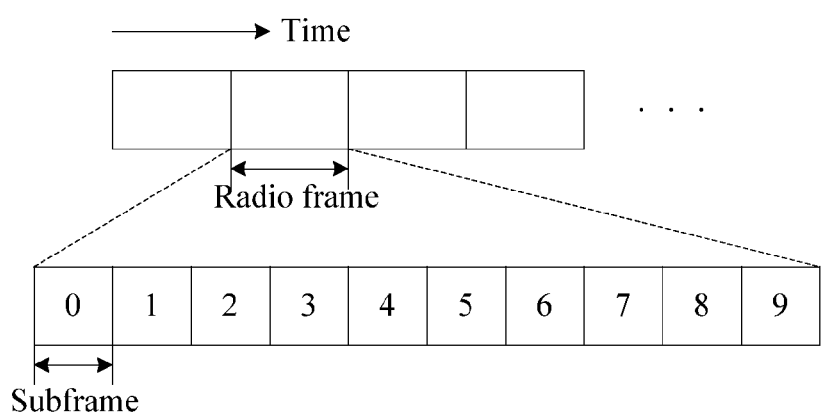
FIG. 7 is a schematic diagram illustrating the structure of a radio frame of an LTD/LTE-A system according to embodiment 2 of the disclosure.

For example, for an LTE/LTE-A system, resources of uplink and downlink are both divided in a time direction in frames. FIG. 7 is a schematic diagram illustrating the structure of a radio frame of an LTE/LTE-A system according to embodiment 2 of the disclosure, and as shown in FIG. 7, the duration of each radio frame is 10 ms, including 10 subframes the duration of which is 1 ms, wherein each subframe includes two slots both having a length of 0.5 ms.

Figure 8:
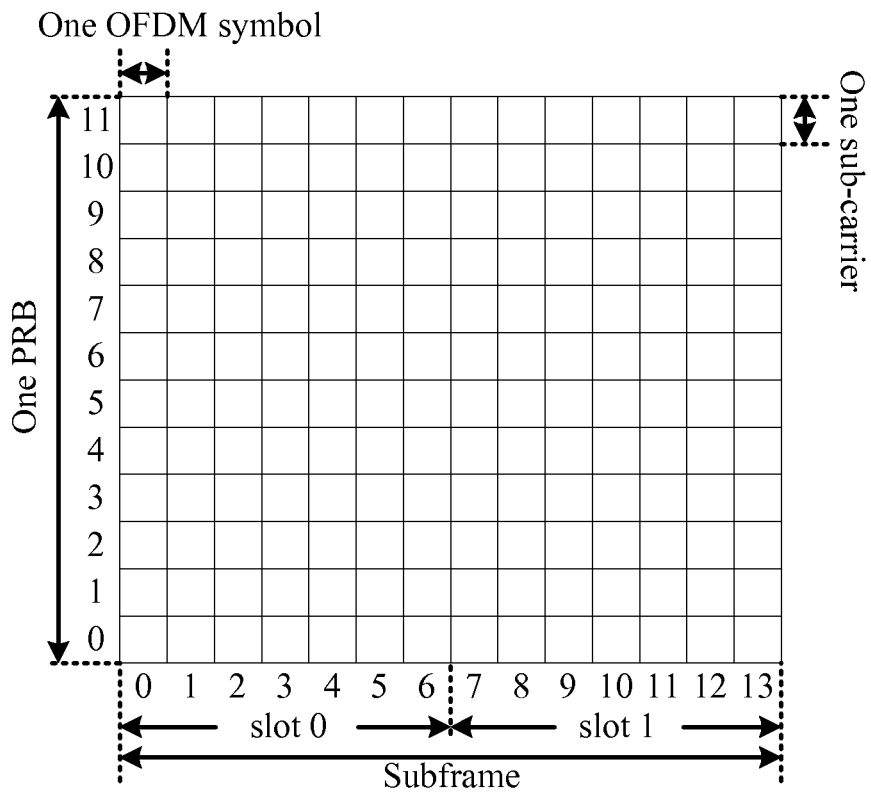
FIG. 8 is a structural schematic diagram illustrating physical resources of an LTD/LTE-A system according to embodiment 2 of the disclosure.

FIG. 8 is a schematic diagram illustrating the structure of physical resources of an LTE/LTE-A system according to embodiment 2 of the disclosure, and as shown in FIG. 8, the resources are divided in a frequency direction in subcarriers. In specific communication, a frequency domain resource is assigned by taking Resource Block (RB) as the minimal unit, one RB corresponding to a Physical RB (PRB) of a physical resource. Each PRB includes 12 sub-carriers in a frequency domain, corresponding to one slot in a time domain. The resources on an OFDM symbol corresponding to a sub-carrier are referred to as a Resource Element (RE).

In an LTE/LTE-A cellular system, downlink measurement is mainly based on Cell-Specific Reference Signal (CRS for short) and Channel State Information-Reference Signal (CSI-RS), the data transmission of downlink is scheduled based on a CRS or CSI-RS measurement result fed from a UE; uplink measurement is usually based on SRS, the data transmission of uplink is scheduled based on the result of the SRS measurement conducted by a network side. In a TDD system, as uplink and downlink use the same frequency band, the scheduling of downlink transmission may also base on an SRS measurement result, that is, using the reciprocity of channels.

It should be noted that the network node mentioned in the embodiment may be one of the following network nodes of an LTE/LTE-A system: evolved Node B (eNB), Relay Node (RN) and other low-power network nodes such as pico, femto, home eNB (HeNB) and that the UE described in the embodiment may be one of the following devices in an LTE/LTE-A system: UE, media server, local server, low-power network node not having independent physical cell identification, and the like.

Specifically, embodiment 2 is described in detail with reference to a plurality of examples.

Example 1

Figure 9:
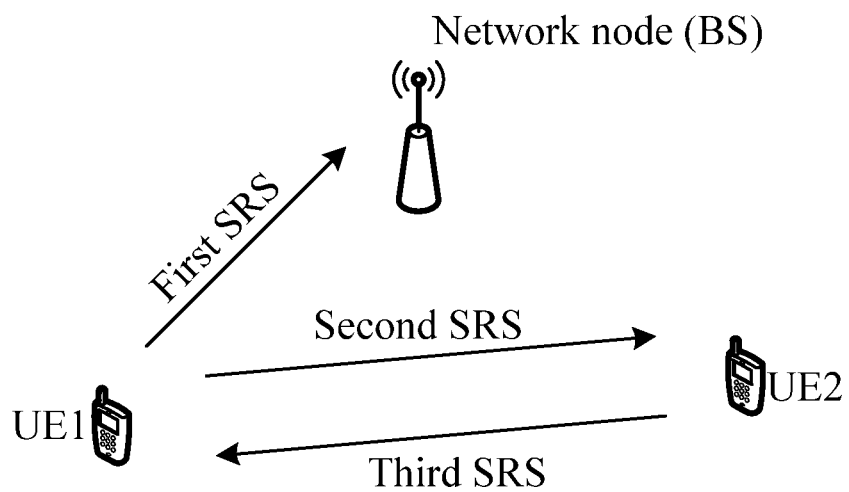
FIG. 9 is a structural schematic diagram illustrating D2D communication according to embodiment 1 of the disclosure.

FIG. 9 is a structural schematic diagram illustrating D2D communication according to example 1 of the disclosure, and as shown in FIG. 9, in this example, a D2D communication control device transmits an SRS configuration information set of a UE to the UE, the configuration information set at least includes three parts: first configuration information, second configuration information and third configuration information.

The first configuration information indicates the configuration of a first SRS which is transmitted by the UE and used for the UE to measure uplink during cellular communication. For example, the first SRS is the cyclic SRS and/or acyclic SRS of uplink in an LTE/LTE-A cellular system.

The second configuration information indicates the configuration of a second SRS which is transmitted by a UE and detected by a peer UE performing D2D communication with the UE and based on which the peer UE measures the channel state of a D2D link to the UE. The second SRS may reuse the design of an SRS used in an LTE/LTE-A cellular system but is different in configuration from the cellular communication SRS (that is, the first SRS) of the UE. The 'different' here means that the second SRS is different in configuration parameters or the values of configuration parameters.

The third configuration information indicates the configuration of a third SRS which is transmitted by a peer UE performing D2D communication with the UE and detected by the UE and based on which the UE measures the channel state of a D2D link to the peer UE. Similarly, the third SRS may reuse of the design of an SRS used in an LTE/LTE-A cellular system but is different in configuration from the foregoing first and second detection reference signals. The 'different' here means that the third SRS is different in configuration parameters or the values of configuration parameters.

In the described embodiment, the foregoing configuration information of an SRS may be higher layer signaling, for example, UE-specific Radio Resource Control (RRC) signaling which may include one or more kinds of the following information: the bandwidth configuration of an SRS, subframe configuration, the number of transmission ports, transmission bandwidth, frequency hopping bandwidth, frequency location, duration, configuration index, transmission comb, sequence cyclic shift and power offset. The UE transmits and detects a D2D SRS according the configuration of the higher layer signaling.

For example, the second configuration information may include the following UE-specific or D2D-specific parameters: the number of SRS transmission antenna ports (srs-Antenna Ports); transmission bandwidth (srs-Bandwidth), frequency location (freqDomainPosition), transmission comb (transmissionComb), a cyclic shift, configuration index (srs-ConfigIndex) and power offset (Psrs-Offset). The srs-BandwidthConfig and the srs-SubframeConfig may be the public configuration information (that is, cell-specific parameters of SRS) of an SRS. Further, the meaning of each parameter is the same as the definition given in LTE/LTE-A standards and is therefore not described here repeatedly.

For example, the parameters contained in the third configuration information may be the same as those contained in the second configuration information and are therefore not described repeatedly.

Further, when the UE transmits and detects a D2D SRS according to the configuration of higher layer signaling, the UE only transmits a D2D SRS in a D2D transmitting subframe and only receives a D2D SRS in a D2D receiving subframe. For example, the higher layer signaling configures the position of the D2D SRS transmitting subframe of the UE, however, the UE only transmits a D2D SRS when the subframe configured by the higher layer signaling is the D2D transmitting subframe of the UE. Similarly, the UE only receives a D2D SRS when the SRS subframe configured by the higher layer signaling for the UE is the D2D receiving subframe of the UE, thus avoiding the transmitting or receiving of a D2D SRS by the UE in a non-D2D transmitting or receiving slot and consequentially eliminating the influence caused by D2D communication on cellular communication.

Figure 10:
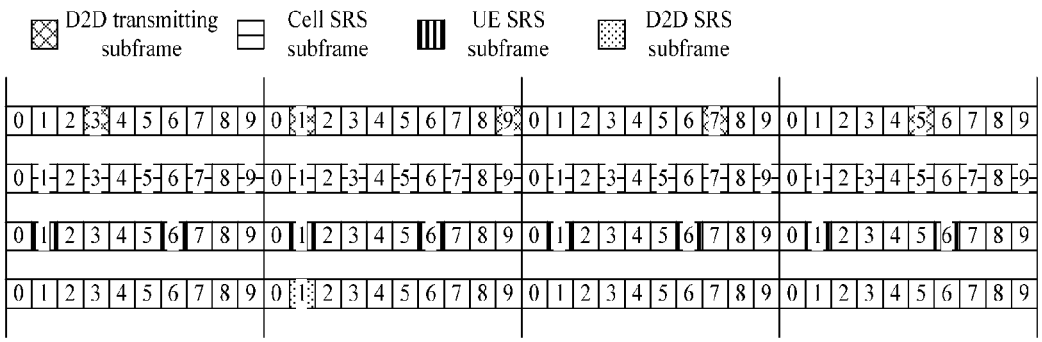
FIG. 10 is a schematic diagram 1 illustrating the position(s) of subframe(s) determined by a UE to transmit a D2D SRS according to embodiment 1 of the disclosure.

For example, the UE may determine the position(s) of subframe(s) transmitting a D2D SRS in the following three ways:

Way 1: the UE determines the position(s) of subframe(s) transmitting a D2D SRS according to a D2D transmitting subframe, a cell-specific SRS subframe and a UE-specific SRS subframe. FIG. 10 is a schematic diagram 1 illustrating the position(s) of subframe(s) transmitting a D2D SRS determined by the UE according to embodiment 1 of the disclosure, in FIG. 10, the srs-SubframeConfig parameter contained in the configuration of a cell-specific SRS indicates a cell-level SRS subframe which is shown by ⊟ in FIG. 10 (that is, srs-SubframeConfig is 2), the srs-ConfigIndex parameter in the second configuration information indicates a UE-specific SRS subframe which is shown by ▥ in FIG. 10 (that is, srs-ConfigIndex is 3), that is, the subframe position where ⊟ and ▥ are overlapped can serve as a second SRS subframe position configured for the UE. However, the UE only transmits a D2D SRS (that is, the second SRS) when the second SRS subframe of the UE is the D2D transmitting subframe of the UE, that is, the subframe ▨ shown in FIG. 10. The UE may detect a D2D SRS (that is, the third SRS) in a similar way which is not described repeatedly. Further, the numeral shown in FIG. 10 denotes a subframe index (the same below).

Figure 11:
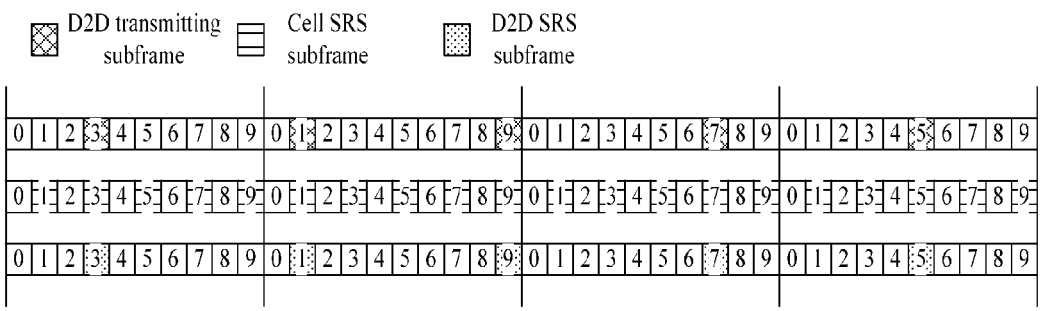
FIG. 11 is a schematic diagram 2 illustrating the position(s) of subframe(s) determined by a UE to transmit a D2D SRS according to embodiment 1 of the disclosure.

Way 2: the UE determines the position(s) of subframe(s) transmitting a D2D SRS according to a D2D transmitting subframe and a cell SRS frame. FIG. 11 is a schematic diagram 2 illustrating the position(s) of subframe(s) determined by a UE to transmit a D2D SRS according to embodiment 1 of the disclosure, in FIG. 11, the srs-SubframeConfig parameter in the configuration of a cell-specific SRS indicates a cell-level SRS subframe shown by ⊟ in FIG. 10 (that is, srs-SubframeConfig is 2). The second configuration information appoints, but not limits, the transmission subframe of the second SRS in such a manner that if a cell-level SRS subframe is the D2D transmitting subframe of the UE, then the UE transmits a D2D SRS (that is, the second SRS) in the subframe, that is, the subframe ▨ shown in FIG. 11, according to the instruction of the second SRS. The UE may detect a D2D SRS (that is, the third SRS) in a similar way which is not described repeatedly.

Figure 12:
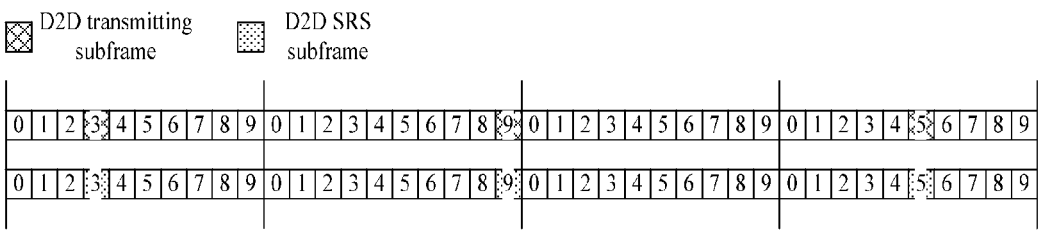
FIG. 12 is a schematic diagram 3 illustrating the position(s) of subframe(s) determined by a UE to transmit a D2D SRS according to embodiment 1 of the disclosure.

Way 3: the UE determines the position(s) of subframe(s) transmitting a D2D SRS according to a D2D transmitting subframe. FIG. 12 is a schematic diagram 3 illustrating the position(s) of subframe(s) determined by a UE to transmit a D2D SRS according to embodiment 1 of the disclosure, and as shown in FIG. 12, when a UE transmits and detects a D2D SRS according to the configuration of higher layer signaling, the higher layer signaling appoints, but not limits, the time domain location (subframe position) where the UE transmits or detects an SRS in such a manner that when the UE needs to transmit a D2D service, the UE transmits a D2D SRS according to the configuration of higher layer signaling, and when the UE needs to receive a D2D service, the UE detects a D2D SRS according to the configuration of higher layer signaling, thus further reducing the complexity of implementation.

Way 4: the UE determines the position(s) of subframe(s) transmitting a D2D SRS according to a D2D transmitting subframe and a UE-specific SRS subframe, wherein the srs-ConfigIndex parameter in the second parameter information indicates a UE-specific SRS subframe. That is, if a subframe is both the D2D transmitting subframe of the UE and a UE-specific SRS subframe, then the subframe is the second SRS transmitting subframe of the UE. The UE may detect a D2D SRS (that is, the third SRS) in a similar way, that is, the UE detects a D2D SRS according to the D2D receiving subframe of the UE and the third configuration information, thus, the detection of a D2D SRS by the UE is not described here repeatedly.

Way 5: the UE determines the position(s) of subframe(s) transmitting a D2D SRS according to a UE-specific SRS subframe, wherein the srs-ConfigIndex parameter in the second parameter information indicates a UE-specific SRS subframe. That is, the UE-specific SRS subframe indicated by the second configuration information is the second SRS transmitting subframe of the UE. The UE may detect a D2D SRS (that is, the third SRS) in a similar way, that is, the UE detects a D2D SRS according to the third configuration information, thus, the detection of a D2D SRS by the UE is not described here repeatedly.

Way 6: the UE determines the position(s) of subframe(s) transmitting a D2D SRS according to a cell-specific SRS subframe and a UE-specific SRS subframe, wherein the srs-SubframeConfig parameter in the configuration of a cell-specific SRS indicates a cell-level SRS subframe, and the srs-ConfigIndex parameter in the second configuration information indicates a UE-specific SRS subframe, that is, a subframe which is both the cell-specific SRS subframe and the UE-specific SRS subframe can serve as a second SRS subframe configured for the UE and in which the UE transmits a D2D SRS (that is, the second SRS). The UE may detect a D2D SRS (that is, the third SRS) in a similar way which is not described repeatedly.

In the described embodiment, the configuration information of an SRS may include higher layer signaling and physical layer signaling, wherein the higher layer signaling indicates the configuration of the SRS, for example, RRC signaling indicates the configuration of a reference signal which specifically includes the parameters described above. The transmitting and the receiving of a D2D SRS can be dynamically triggered by the physical layer signaling, for example, D2D communication SRS triggering signaling is set in D2D grant, the triggering signaling triggers the UE to transmit a D2D SRS, that is, the foregoing second SRS, or triggers the UE to detect a D2D SRS, that is, the foregoing third SRS.

For example, the triggering signalling is one bit contained in grant for scheduling the UE to perform a D2D transmitting operation, and when set to be 1, the 1-bit triggering signaling represents that the UE is triggered to transmit a D2D SRS, or the triggering signaling is one bit contained in grant for scheduling the UE to perform a D2D receiving operation, and when set to be 1, the 1-bit triggering signaling represents the UE is triggered to detect a D2D SRS. Alternatively, the triggering signaling is one bit contained in grant for scheduling the UE to perform D2D communication, and when set to be 1, the 1-bit triggering signaling represents that the transmitting/receiving of a D2D SRS by a D2D transmitting UE/D2D receiving UE is triggered. The combination of the higher layer signaling with the physical layer signaling guarantees the flexibility of the transmitting/receiving of an SRS during D2D communication and avoids unnecessary SRS transmitting and measurement, thus saving the power consumption of the UE.

Further, after receiving the triggering signaling, the UE can transmit the second SRS in the first D2D transmitting subframe meeting a specific time interval or detects the third SRS in the first D2D receiving subframe meeting a specific time interval requirement; or after receiving the triggering signaling, the UE transmits the second SRS in the first subframe which meets a specific time interval requirement and which is both a D2D transmitting subframe and an SRS subframe or detects the third SRS in the first subframe which meets a specific time interval requirement and which is both a D2D transmitting subframe and an SRS subframe. Further, the specific time interval may be 4 mile-seconds (ms), that is, four subframes in an LTE/LTE-A system.

Example 2

Figure 13:
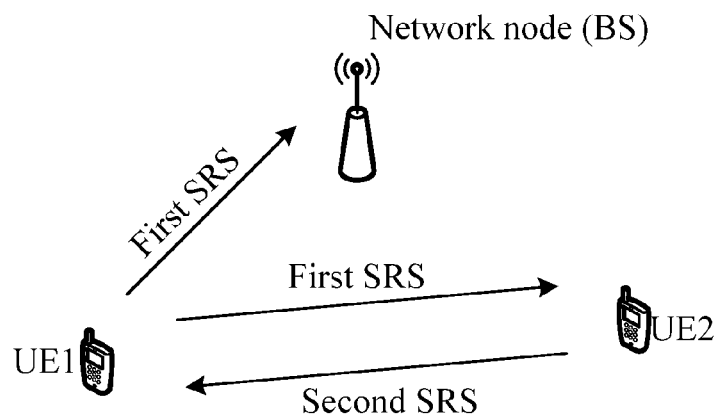
FIG. 13 is a structural schematic diagram illustrating D2D communication according to embodiment 2 of the disclosure.

FIG. 13 is a structural schematic diagram illustrating D2D communication according to example 2 of the disclosure, and as shown in FIG. 13, in this example, a D2D communication control device transmits the SRS configuration information set of a UE to the UE, the configuration information set at least includes two parts: first configuration information and second configuration information, wherein the first configuration information indicates the configuration of a first SRS which is transmitted by the UE to measure a cellular uplink and a D2D channel. That is, for a UE performing D2D communication, the D2D communication SRS transmitted by the UE reuses the configuration of the cellular uplink SRS of the UE, for example, the cyclic SRS and/or the acyclic SRS of uplink in an LTE/LTE-A cellular system. When the first SRS transmitted by the UE is used to measure the channel of a D2D link, the peer UE performing D2D communication with the UE receives the first SRS and measures a D2D link to the UE based on the first SRS received.

The second configuration information indicates the configuration of a second SRS which is transmitted by the peer UE performing D2D communication with the UE to measure a D2D link; after receiving the second SRS, the UE measures the channel state of a D2D link to the peer UE based on the result of the measurement. As described above, the configuration of the second SRS is the same as that of the first SRS of the peer UE, that is, the second SRS reuses the configuration of the SRS of the cellular uplink of the peer UE, in other words, to measure a D2D communication channel, it is needed to indicate the SRS of the cellular uplink of a D2D UE to the peer UE performing D2D communication with the D2D UE, thereby realizing the reuse of the cellular uplink SRS in D2D link measurement.

In the described embodiment, the configuration information of a reference signal described in the example is higher layer signaling, for example, UE-specific RRC signaling which may include one of more kinds of the following information: the bandwidth configuration of an SRS, subframe configuration, the number of transmission ports, transmission bandwidth, frequency hopping bandwidth, frequency location, duration, configuration index, transmission comb, sequence cyclic shift and power offset. The UE transmits and detects a D2D SRS according the configuration of the higher layer signaling.

Further, when transmitting the first SRS according to the configuration of the higher layer signaling, the UE does not need to distinguish subframe types of transmission reference signals, that is, distinguish whether or not a reference signal transmission subframe is an ordinary subframe or a D2D communication subframe. However, there may be two SRS power offset parameters configured for the UE, including one power offset parameter for determining the SRS transmitting power of a cellular uplink and one power offset parameter for determining an SRS transmitting power during D2D communication. When receiving the second SRS according to the configuration of the higher layer signaling, the UE only receives the second SRS in a D2D communication receiving subframe.

Figure 14:
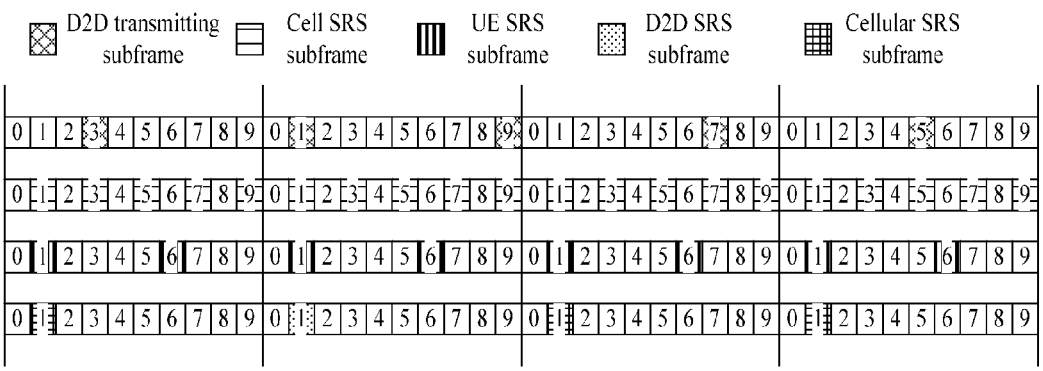
FIG. 14 is a schematic diagram 3 illustrating the position(s) of subframe(s) determined by a UE to transmit a D2D SRS according to embodiment 2 of the disclosure.

For example, the position(s) of subframe(s) transmitting a D2D SRS can be determined according to a D2D transmitting subframe, a cell SRS subframe and a UE SRS subframe. FIG. 14 is a schematic diagram illustrating the position(s) of subframe(s) determined by a UE to transmit a D2D SRS according to embodiment 2 of the disclosure, in FIG. 14, the srs-SubframeConfig parameter in the configuration of a cell-specific SRS indicates a cell-level SRS subframe which is shown by ⊟ in FIG. 14 (that is, srs-SubframeConfig is 2), the srs-ConfigIndex parameter in the first configuration information indicates a UE-specific SRS subframe which is shown by ☐ shown FIG. 14 (that is, srs-ConfigIndex is 3), that is, the subframe position where ⊟ and ☐ are overlapped is a first SRS subframe position configured for the UE. For example, when the first SRS subframe of the UE is used for an uplink cellular link, the first SRS, as shown by ▦ shown in FIG. 14, is transmitted at the first power offset; and when the first SRS subframe of the UE is used for a D2D link, the first SRS, as shown by the subframe ☐ shown in FIG. 14, is transmitted at the second power offset.

The UE may detect a D2D SRS, that is, the second SRS, in a similar way, that is, the UE detects the second SRS in a subframe which is a cell-public SRS subframe, the SRS subframe indicated by the second configuration information and the D2D receiving subframe of the UE at the power offset indicated by the second configuration information, the detection processing is not described here repeatedly.

In the described embodiment, the configuration information of a reference signal may include higher layer signaling and physical layer signaling, wherein the higher layer signaling indicates the configuration of the reference signal, for example, UE-specific RRC signaling indicates the configuration of a reference signal which specifically includes the parameters described above. The transmitting and the receiving of the first SRS and the second SRS may be dynamically triggered by the physical layer signaling, for example, SRS triggering signaling is set in grant to trigger the UE to transmit an SRS, that is, the foregoing first SRS, or to trigger the UE to receive an SRS, that is, the foregoing second SRS.

For example, the triggering signalling is one bit contained in grant for scheduling the transmitting action of the UE; when set to be 1, the 1-bit triggering signaling represents the transmission of an SRS by the UE, and when set to be 0, the 1-bit triggering signaling represents that the UE implements no SRS-related actions; or the triggering signaling is one bit contained in grant for scheduling the receiving action of the UE, when set to be 1, the 1-bit triggering signaling represents the detection of an SRS by the UE, and when set to be 1, the 1-bit triggering signaling represents that the UE implements no SRS-related actions. Alternatively, the triggering signaling is one bit contained in grant for scheduling the UE to perform D2D communication, when set to be 1, the 1-bit triggering signaling represents the transmitting/receiving of a D2D SRS by a D2D transmitting UE/D2D receiving UE, and when set to be 0, the 1-bit triggering signaling represents that no SRS-related action is implementation by the UE. The combination of the higher layer signaling with the physical layer signaling guarantees the flexibility of the transmitting/receiving of an SRS during D2D communication and avoids unnecessary SRS transmitting and measurement, thus saving the power consumption of the UE.

Further, the UE transmits the first SRS without distinguishing subframe types, that is, the UE transmits the first SRS in the first subframe meeting a transmitting condition after receiving triggering signaling, without distinguishing whether or not the subframe is a cellular communication subframe or a D2D communication transmitting subframe. Or the UE transmits the first SRS with subframe types distinguished, that is, the UE transmits the first SRS in the first cellular communication subframe meeting a cellular uplink SRS transmitting condition if the triggering signaling received is contained in grant for scheduling cellular communication or in the first D2D communication subframe meeting a D2D link SRS transmitting condition if the triggering signaling received is contained in grant for scheduling D2D communication. The UE receives the second SRS with subframe types distinguished, that is, the UE receives the second SRS in the first D2D receiving subframe meeting a D2D link SRS receiving condition when the received triggering signaling is contained in grant for scheduling D2D communication. Further, the foregoing transmitting condition and/or the foregoing receiving condition may be that the foregoing subframe is an SRS subframe configured at a network side and the first SRS subframe which is spaced by a time interval of equal to or greater than 4 ms from the foregoing triggering signaling transmitting subframe.

Example 3

Figure 15:
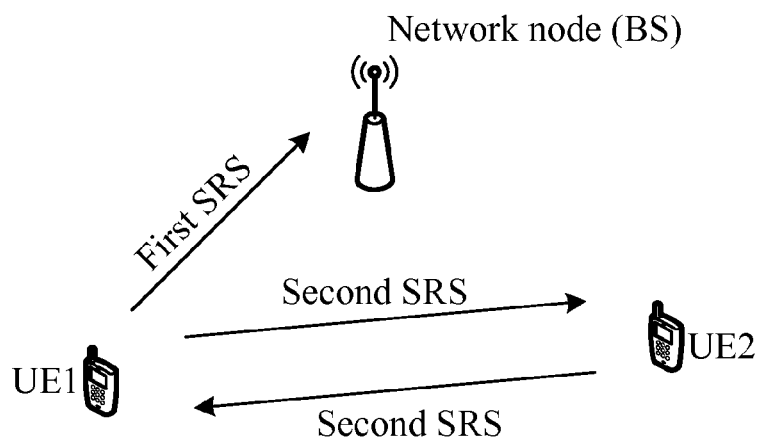
FIG. 15 is a structural schematic diagram illustrating D2D communication according to embodiment 3 of the disclosure.

FIG. 15 is a structural schematic diagram illustrating D2D communication according to embodiment 3 of the disclosure, and as shown in FIG. 15, in this example, a D2D communication control device transmits the SRS configuration information set of an UE to the UE, the configuration information set including two parts: first configuration information and second configuration information. The first configuration information indicates the configuration of a first SRS for measuring a cellular uplink, for example, the cyclic SRS and/or the acyclic SRS of uplink in an LTE/LTE-A cellular system.

The second configuration information indicates the configuration of a second SRS for measuring a D2D communication channel which is received and/or transmitted by the UE during D2D communication, that is, the peer UE performing D2D communication with the UE has the same second reference signal configuration with the UE, in other words, two UEs between which D2D communication is performed have the same second SRS configuration. The second SRS may reuse the design of the SRS used in an LTE/LTE-A cellular system but is different in configuration to the cellular communication SRS, that is, the first SRS, of the UE.

In the described embodiment, the configuration information of a reference signal described in the example may be higher layer signaling, for example, UE-specific RRC signaling which may include one of more kinds of the following information: the bandwidth configuration of an SRS, subframe configuration, the number of transmission ports, transmission bandwidth, frequency hopping bandwidth, frequency location, duration, configuration index, transmission comb, sequence cyclic shift and power offset. The UE transmits and detects a D2D SRS according the configuration of the higher layer signaling.

Further, when transmitting and detecting a D2D SRS according to the configuration of the higher layer signaling, the UE only transmits a D2D SRS in a D2D transmitting subframe and only receives a D2D SRS in a D2D receiving subframe. For example, the higher layer signaling configures the position of the D2D SRS transmitting subframe (that is, the second SRS) of the UE, however, the UE only transmits a D2D SRS when the subframe configured by the higher layer signaling is the D2D transmitting subframe of the UE. Similarly, the UE only receives a D2D SRS when the D2D SRS receiving subframe configured by the higher layer signaling is the D2D receiving subframe of the UE, thus avoiding the transmitting or receiving of a D2D SRS by the UE in a non-D2D transmitting or receiving slot and consequentially eliminating the influence caused by D2D communication on cellular communication.

Figure 16:
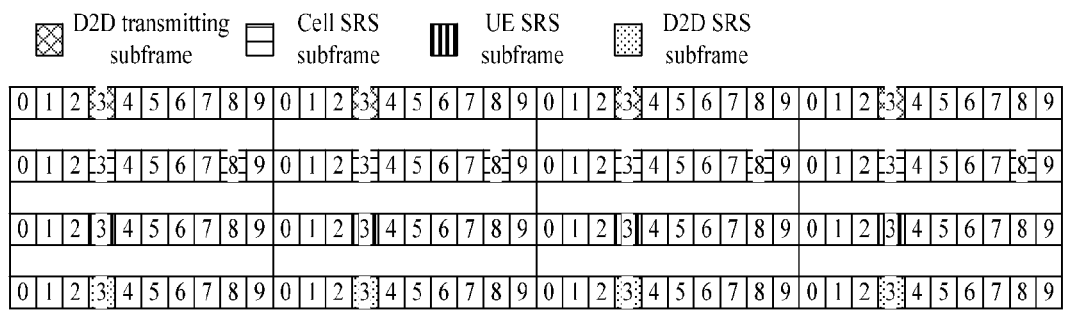
FIG. 16 is a schematic diagram 1 illustrating the position(s) of subframe(s) determined by a UE to transmit a D2D SRS according to embodiment 3 of the disclosure.

For example, the UE may determine the position(s) of subframe(s) transmitting a D2D SRS in the following ways:

Way 1: the UE determines the position(s) of subframe(s) transmitting a D2D SRS according to a D2D transmitting subframe, a cell-specific SRS subframe and a UE-specific SRS subframe. FIG. 16 is a schematic diagram 1 illustrating the position(s) of subframe(s) determined by a UE to transmit a D2D SRS according to embodiment 3 of the disclosure, in FIG. 16, the srs-SubframeConfig parameter in the configuration of a cell-specific SRS indicates a cell-level SRS subframe which is shown by ▯ in FIG. 16 (that is, srs-SubframeConfig is 6), the srs-ConfigIndex parameter in the second configuration information indicates a UE-specific SRS subframe which is shown by ▯ in FIG. 16 (that is, srs-ConfigIndex is 10), that is, the subframe position where ▯ and ▯ are overlapped can serve as a second SRS subframe of the UE. However, the UE only transmits a D2D SRS (that is, the second SRS) when the second SRS subframe of the UE is the D2D transmitting subframe of the UE, that is, the subframe ▯ shown in FIG. 16.

The UE may detect anSRS (that is, the second SRS) transmitted from anpeer UE in a similar way which is not described repeatedly.

Way 2: the UE determines the position(s) of subframe(s) transmitting a D2D SRS according to a D2D transmitting/receiving subframe and a cell SRS subframe.

Figure 17:
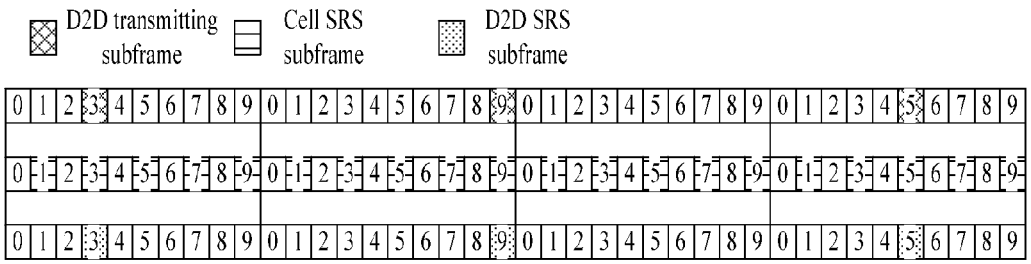
FIG. 17 is a schematic diagram 2 illustrating the position(s) of subframe(s) determined by a UE to transmit a D2D SRS according to embodiment 3 of the disclosure.
Figure 18:
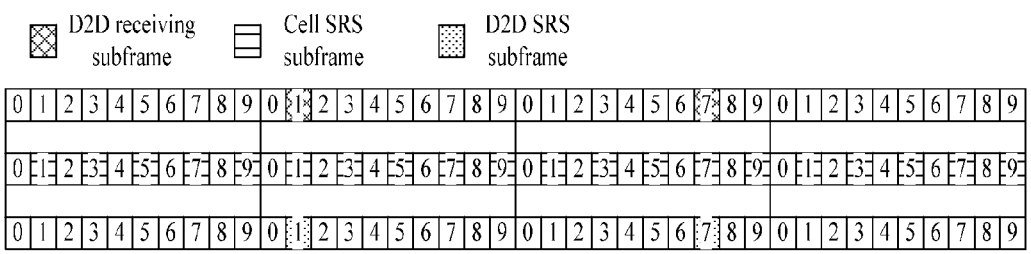
FIG. 18 is a schematic diagram 3 illustrating the position(s) of subframe(s) determined by a UE to transmit a D2D SRS according to embodiment 3 of the disclosure.

FIG. 17 is a schematic diagram 2 illustrating the position(s) of subframe(s) determined by a UE to transmit a D2D SRS according to embodiment 3 of the disclosure; and as shown in FIG. 17, ▯ represents the D2D transmitting subframe of the UE and ▯ represents a cell-specific SRS subframe. Instead of indicating a UE-specific SRS subframe in the second configuration information, It is appointed that the UE transmits the second SRS according to the configuration of the second configuration information when the D2D transmitting subframe of the UE is a cell-specific SRS subframe. FIG. 18 is a schematic diagram 3 illustrating the position(s) of subframe(s) determined by a UE to transmit a D2D SRS according to embodiment 3 of the disclosure, similarly, as shown in FIG. 18, the UE detects the second SRS transmitted by a peer UE according to the configuration of the second configuration information when the D2D receiving subframe of the UE is a cell-specific SRS subframe.

For the sake of simplicity, the SRS of a D2D link, that is, the second SRS, may not follow the configuration of a cell-specific SRS, and it is appointed that the UE transmits the second SRS in a D2D transmitting subframe according to the configuration of the second configuration information and the UE detects the second SRS in a D2D receiving subframe according to the configuration of the second configuration information; or it is appointed that the UE transmits a D2D SRS according to the configuration of the second configuration information when needing to transmit a D2D service and receives a D2D SRS according to the configuration of the second configuration information when needing to receive a D2D service, thus further reducing the complexity of implementation. No detailed description is given.

In the described embodiment, the configuration information of an SRS may include higher layer signaling and physical layer signaling, wherein the higher layer signaling indicates the configuration of the SRS, for example, dedicated RRC signaling indicates the configuration of a reference signal which may specifically include the parameters described above. The transmitting and the receiving of a D2D SRS can be dynamically triggered by the physical layer signaling, for example, D2D communication SRS triggering signaling is set in D2D grant, the triggering signaling triggers the UE to transmit a D2D SRS, that is, the foregoing second SRS.

For example, the triggering signalling is one bit contained in grant for scheduling the D2D transmitting action of the UE; when set to be 1, the 1-bit triggering signaling represents the transmission of a D2D SRS by the UE and when set to be 0, the 1-bit triggering signaling represents that the UE implements no D2D SRS-related actions; or the triggering signaling is one bit contained in grant for scheduling the D2D receiving action of the UE, when set to be 1, the 1-bit triggering signaling represents the detection of a D2D SRS by the UE, and when set to be 0, the 1-bit triggering signaling represents the UE implements no D2D SRS-related actions. Alternatively, the triggering signaling is one bit contained in grant for scheduling the UE to perform D2D communication, when set to be 1, the 1-bit triggering signaling represents the transmitting/receiving of a D2D SRS by a D2D transmitting UE/D2D receiving UE, and when set to be 0, the 1-bit triggering signaling represents that no SRS-related action is performed by the UE. The combination of the higher layer signaling with the physical layer signaling guarantees the flexibility of the transmitting/receiving of an SRS during D2D communication and avoids unnecessary SRS transmitting and measurement, thus saving the power consumption of the UE.

Further, after receiving the triggering signaling, the UE may transmit the second SRS in the first D2D transmitting subframe meeting a specific time interval requirement or receive the second SRS in the first D2D receiving subframe meeting a specific time interval requirement; or after receiving the triggering signaling, the UE transmits the second SRS in the first subframe which meets a specific time interval requirement and which is both a D2D transmitting subframe and an SRS subframe. Further, the specific time interval may be 4 ms, that is, four subframes in an LTE/LTE-A system. The specific time interval being 4 ms is merely an example but not a limitation, and theoretically, the specific time interval may be any integer (ms).

For example, after receiving the triggering signaling, the UE may transmit the second SRS in the first D2D SRS transmitting subframe meeting a specific time interval requirement, wherein the D2D SRS transmitting subframe can be determined in the way described above, and similarly, after receiving the triggering signaling, the UE may receive the second SRS in the first D2D SRS receiving subframe meeting a specific time interval requirement. Further, the specific time interval may be 4 ms, that is, four subframes in an LTE/LTE-A system. The specific time interval being 4 ms is merely an example but not a limitation, and theoretically, the specific time interval may be any integer (ms).

Figure 19:
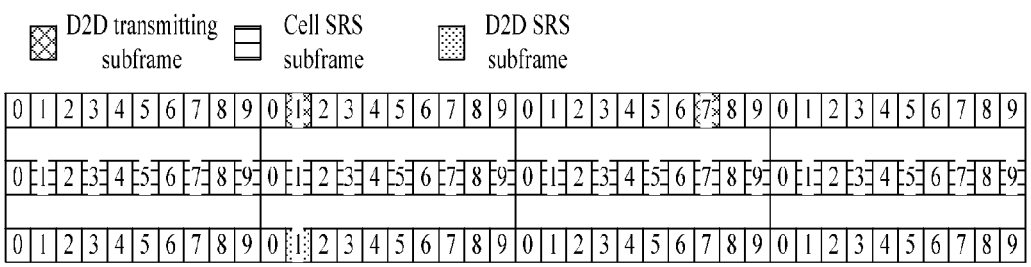
FIG. 19 is a schematic diagram 4 illustrating the position(s) of subframe(s) determined by a UE to transmit a D2D SRS according to embodiment 3 of the disclosure.

FIG. 19 is a schematic diagram 4 illustrating the position(s) of subframe(s) determined by a UE to transmit a D2D SRS according to embodiment 3 of the disclosure, and as shown in FIG. 19, ▨ represents the D2D transmitting subframe of the UE and ☐ represents a cell-specific SRS subframe; a UE-specific SRS subframe is not indicated in the second configuration information. It is assumed that the signaling for triggering the UE to transmit the second SRS is contained in grant for scheduling the UE to perform a D2D transmitting action and granted with a transmission sequence 4. That is, grant granting the UE to transmit a D2D service in a D2D transmitting subframe 1 is transmitted in the subframe 7 of the former radio frame, when the triggering signaling of the grant is set to trigger the UE to transmit the second SRS, the UE transmits a D2D SRS in the D2D transmitting subframe 1. The UE detects the second SRS in a similar way which is not described repeatedly.

In conclusion, a method and a device for transmitting a reference signal in a cellular system supporting D2D communication is provided in the foregoing embodiments which indicate a channel measurement SRS for a UE during cellular communication and D2D communication by transmitting an SRS configuration information set to a user terminal from a network node, thereby addressing the problem of the configuration and the transmission of a reference signal existing in the conventional art when D2D communication is introduced into a cellular system, realizing the compatibility of D2D communication with cellular communication and improving system performance.

Apparently, it should be appreciated by those skilled in the art that each component or step described in the disclosure can be realized by a universal computer and that the components or steps may be integrated on a single computer or distributed on a network consisting of a plurality of computers, optionally, the components or steps may be realized by executable program codes so that the components or steps can be stored in a memory to be executed by a computer, and in some cases, the steps shown or described herein can be executed in a sequence different from this presented herein, or the components or steps are formed into integrated circuit components, or several of the components or steps are formed into integrated circuit components. Therefore, the disclosure is not limited to the combination of specific hardware and software. Therefore, the disclosure is not limited to the combination of specific hardware and software.

The mentioned above is merely example embodiments of the disclosure but is not to be construed as limitation to the protection scope of the disclosure. A variety of modifications and variations can be devised by those of skilled in the art. Any modification, equivalent or improvement devised without departing from the spirit and scope of the disclosure should fall within the protection range of the disclosure.

The invention claimed is:

1. A method for transmitting a Sounding Reference Signal (SRS), comprising:
   transmitting, by a network node, an SRS configuration information set to a user equipment (UE), wherein the SRS configuration information set comprises: first configuration information indicating configuration of a first SRS, and second configuration information indicating configuration of a second SRS,
   wherein the first SRS is transmitted on a cellular uplink and used for performing uplink channel measurement during cellular communication; and the second SRS is transmitted on a device-to-device (D2D) link and used for performing channel measurement of the D2D link during D2D communication.

2. The method according to claim 1, wherein the second SRS is an SRS transmitted from a UE to its peer UE during D2D communication, the SRS configuration information set further comprises: third configuration information indicating configuration of a third SRS, wherein the third SRS is an SRS transmitted from the peer UE and detected by the UE during D2D communication and used for performing channel measurement of a D2D link during D2D communication.

3. The method according to claim 2, wherein each of the first configuration information, the second configuration information and the third configuration information comprises: high layer configuration signaling, wherein the high layer configuration signaling comprises at least one of the following parameters: bandwidth configuration of an SRS, subframe configuration, the number of transmission ports, transmission bandwidth, frequency hopping bandwidth, frequency location, duration, configuration index, transmission comb, sequence cyclic shift and power offset.

4. The method according to claim 2, wherein the second SRS is transmitted by the UE in a subframe meeting the first condition according to the configuration of the second configuration information, wherein the subframe meeting the first condition comprises one of:
   a transmitting subframe of the UE during D2D communication;
   a cell-specific SRS subframe which is also a transmitting subframe of the UE during D2D communication;
   a cell-specific SRS subframe which is also an SRS subframe indicated by the second configuration information and also a transmitting subframe of the UE during D2D communication;
   an SRS subframe indicated by the second configuration information which is also a transmitting subframe of the UE during D2D communication;
   an SRS subframe indicated by the second configuration information; and
   a cell-specific SRS subframe which is also an SRS subframe indicated by the second configuration information
   and/or,
   the third SRS is transmitted in a subframe meeting a second condition according to the configuration of the third configuration information, wherein the subframe meeting the second condition comprises one of:
   a receiving subframe of the UE during D2D communication;
   a cell-specific SRS subframe which is also a receiving subframe of the UE during D2D communication;
   a cell-specific SRS subframe which is also an SRS subframe indicated by the third configuration information and also a receiving subframe of the UE during D2D communication;
   an SRS subframe indicated by the third configuration information which is also a receiving subframe of the UE during D2D communication;
   an SRS subframe indicated by the third configuration information; and
   a cell-specific SRS subframe which is also an SRS subframe indicated by the third configuration information.

5. The method according to claim 4, wherein a first triggering signaling for triggering the UE to transmit the second SRS is contained in the second configuration information, a second triggering signaling for triggering the UE to detect the third SRS is contained in the third configuration information.

6. The method according to claim 1, wherein the first SRS transmitted by a UE to a peer UE in D2D communication is also used by the peer UE to perform, channel measurement of the D2D link, and the second SRS transmitted by the peer UE in D2D communication is used for the UE to perform channel measurement of a D2D link during the D2D communication.

7. The method according to claim 6, wherein a subframe used by the UE to transmit the first SRS is a subframe meeting a first condition according to the configuration of the first configuration information, and a subframe used by the UE to detect the second SRS is a subframe meeting a second condition according to the configuration of the second configuration information;

the subframe meeting the first condition is an SRS subframe indicated by the first configuration information, the subframe meeting the second condition is an SRS subframe indicated by the second configuration information, and the subframe meeting the first condition and the subframe meeting the second condition are also cell-specific SRS subframes.

8. The method according to claim 7, wherein the first configuration information contains first triggering signaling for triggering the UE to transmit the first SRS, the second configuration information contains second triggering signaling for triggering the UE to detect the second SRS.

9. The method according to claim 6, wherein the first configuration information contains a power offset parameter, wherein the power offset parameter comprises a first power offset and a second power offset, wherein the first power offset is used for determining the power at which the UE transmits the first SRS on uplink in a cellular system and the second power offset is used for determining the power at which the UE transmits the first SRS on a D2D link; and after the network node transmits the SRS configuration information set to the UE, the method further comprises:

if the subframe transmitting the first SRS is a D2D communication transmitting subframe of the UE, transmitting, by the UE, the first SRS at the second power offset, otherwise, transmitting, by the UE, the first SRS at the first power offset.

10. The method according to claim 1, wherein the second SRS is an SRS transmitted by a UE to a peer UE during D2D communication and used for the peer UE to perform channel measurement during D2D communication, and an SRS transmitted by the peer UE and detected by the UE during D2D communication and used for the UE to perform channel measurement of D2D communication.

11. The method according to claim 10, wherein the second SRS is transmitted by the UE in a subframe meeting a first condition according to the configuration of the second configuration information, wherein the subframe meeting the first condition comprises one of:

a transmitting subframe of the UE during D2D communication;
a cell-specific SRS subframe which is also a transmitting subframe of the UE during D2D communication; and
a cell-specific SRS subframe which is also an SRS subframe indicated by the second configuration information and also a transmitting subframe of the UE during D2D communication
and/or,
the second SRS is transmitted in a subframe meeting a second condition according to the configuration of the second configuration information, wherein the subframe meeting the second condition comprises one of:

a receiving subframe of the UE during D2D communication;
a cell-specific SRS subframe which is also a receiving subframe of the UE during D2D communication; and
a cell-specific SRS subframe which is also an SRS subframe indicated by the second configuration information and also a receiving subframe of the UE during D2D communication.

12. The method according to claim 11, wherein the second configuration information contains first triggering signaling for triggering the UE to transmit the second SRS and second triggering signaling for triggering the UE to detect the second SRS.

13. A method for transmitting a Sounding Reference Signal (SRS), comprising:

receiving, by a user equipment (UE), an SRS configuration information set from a network node, wherein the SRS configuration information set comprises first configuration information indicating configuration of a first SRS and second configuration information indicating configuration of a second SRS, wherein the first SRS is transmitted on a cellular uplink and used for performing uplink channel measurement during cellular communication; and the second SRS is transmitted on a device-to-device (D2D) link and used for performing channel measurement of the D2D link during D2D communication.

14. The method according to claim 13, wherein the second SRS is an SRS transmitted by a UE to its peer UE during D2D communication, the SRS configuration information set further comprises: third configuration information indicating configuration of a third SRS, wherein the third SRS is an SRS transmitted from the peer UE and detected by the UE during D2D communication and used for performing channel measurement of a D2D link during D2D communication.

15. The method according to claim 13, wherein the first SRS transmitted by the UE to its peer UE in D2D communication is also used for the peer UE to perform channel measurement of a D2D link; and the second SRS transmitted by the peer UE in D2D communication is used for the UE to perform channel measurement of a D2D link during the D2D communication.

16. The method according to claim 13, wherein the second SRS is an SRS transmitted by the UE to its peer UE during D2D communication for the peer UE to perform channel measurement of D2D communication and an SRS transmitted by the peer UE and detected by the UE during D2D communication and used for the UE to perform channel measurement of D2D communication.

17. The method according to claim 13, wherein after the UE receives, from the network node, the SRS configuration information set indicating the SRS configuration, the method further comprises:

transmitting, by the UE, the first SRS, which is used for performing uplink channel measurement in a cellular system, to the network node according to the first configuration information or transmitting, by the UE, the first SRS, which is used for performing channel measurement of a D2D link, to the peer UE according to the first configuration information during D2D communication; and/or the UE transmitting the second SRS to the peer UE or detecting the second SRS from the peer UE during D2D communication according to the second configuration information to perform channel measurement of a D2D link.

18. The method according to claim 17, wherein
the second SRS is transmitted from the UE in a subframe meeting the first condition according to the configuration of the second configuration information, wherein the subframe meeting the first condition comprises one of:
a transmitting subframe of the UE during D2D communication;
a cell-specific SRS subframe which is also a transmitting subframe of the UE during D2D communication;
a cell-specific SRS subframe which is also an SRS subframe indicated by the second configuration information and also a transmitting subframe of the UE during D2D communication;
an SRS subframe indicated by the second configuration information which is also a transmitting subframe of the UE during D2D communication;
an SRS subframe indicated by the second configuration information; and
a cell-specific SRS subframe which is also an SRS subframe indicated by the second configuration information;
and/or,
the third SRS is transmitted in a subframe meeting a second condition according to the configuration of the third configuration information, wherein the subframe meeting the second condition comprises one of:
a receiving subframe of the UE during D2D communication;
a cell-specific SRS subframe which is also a receiving subframe of the UE during D2D communication;
a cell-specific SRS subframe which is also an SRS subframe indicated by the third configuration information and also a receiving subframe of the UE during D2D communication;
an SRS subframe indicated by the third configuration information which is also a receiving subframe of the UE during D2D communication;
an SRS subframe indicated by the third configuration information; and
a cell-specific SRS subframe which is also an SRS subframe indicated by the third configuration information.

19. A user equipment (UE), comprising:
a receiving component configured to receive, from a network node, an SRS configuration information set indicating Sounding Reference Signal (SRS) configuration, wherein the SRS configuration information set comprises first configuration information indicating configuration of a first SRS and second configuration information indicating configuration of a second SRS,
wherein the first SRS is transmitted on a cellular uplink and used for performing uplink channel measurement during cellular communication; and the second SRS is transmitted on a device-to-device (D2D) link and used for performing channel measurement of the D2D link during D2D communication.

20. The UE according to claim 19, further comprising:
a first configuration information component configured to transmit the first SRS, which is used for performing uplink channel measurement in a cellular system, to the network node according to the first configuration information or transmit the first SRS, which is used for performing channel measurement of a D2D link, to a peer UE during D2D communication according to the first configuration information; and/or
a second configuration information component configured to transmit the second SRS to the peer UE or detect the second SRS from the peer UE during D2D communication according to the second configuration information to perform channel measurement of a D2D link.

* * * * *